United States Patent [19]

Rau

[11] Patent Number: 4,947,385
[45] Date of Patent: Aug. 7, 1990

[54] MONITORING SYSTEM FOR A LOCAL BUS NETWORK IN A STAR STRUCTURE

[75] Inventor: Peter Rau, Munich, Fed. Rep. of Germany

[73] Assignee: Siemens Aktiengesellschaft, Berlin and Munich, Fed. Rep. of Germany

[21] Appl. No.: 445,095

[22] Filed: Dec. 6, 1989

Related U.S. Application Data

[63] Continuation of Ser. No. 187,023, Apr. 27, 1988, abandoned.

[30] Foreign Application Priority Data

May 7, 1987 [DE] Fed. Rep. of Germany ....... 3715223

[51] Int. Cl.$^5$ ............................................. H04J 1/16
[52] U.S. Cl. .................................... 370/14; 370/85.9; 370/94.3
[58] Field of Search .................... 370/118.1, 58.1, 1, 370/4, 15, 16, 85.1, 85.9, 94.3, 14; 455/600, 601

[56] References Cited

U.S. PATENT DOCUMENTS

| | | | |
|---|---|---|---|
| 4,417,334 | 11/1983 | Gunderson et al. | 370/1 |
| 4,613,858 | 9/1986 | Davidson et al. | 370/85 |
| 4,716,408 | 12/1987 | O'Connor et al. | 370/56 |
| 4,740,957 | 4/1988 | Cassidy et al. | 370/96 |
| 4,750,168 | 6/1988 | Trevitt | 370/85 |

OTHER PUBLICATIONS

"An Experimental Optical Local Area Network Using Fast Circuit Switching", International Switching Symposium (1987).
9 Telecom Report 1-14 (1986).

Primary Examiner—Joseph A. Orsino
Assistant Examiner—Frank M. Scutch, III
Attorney, Agent, or Firm—Hill, Van Santen, Steadman & Simpson

[57] ABSTRACT

A local bus network is constructed in a star configuration and comprises transmission direction-associated star lines, the transmission channels leading from the peripheral stations to the central star point being respectively monitored at the star point for the appearance of a channel state signal transmitted from the respective station and identifying the transmission channel as busy or free. The useful signal transmitted in the transmission channel is thereby only forwarded after recognition of a "busy" signal, whereas the appertaining transmission channel is otherwise inhibited at the central star point at the receiver.

7 Claims, 2 Drawing Sheets

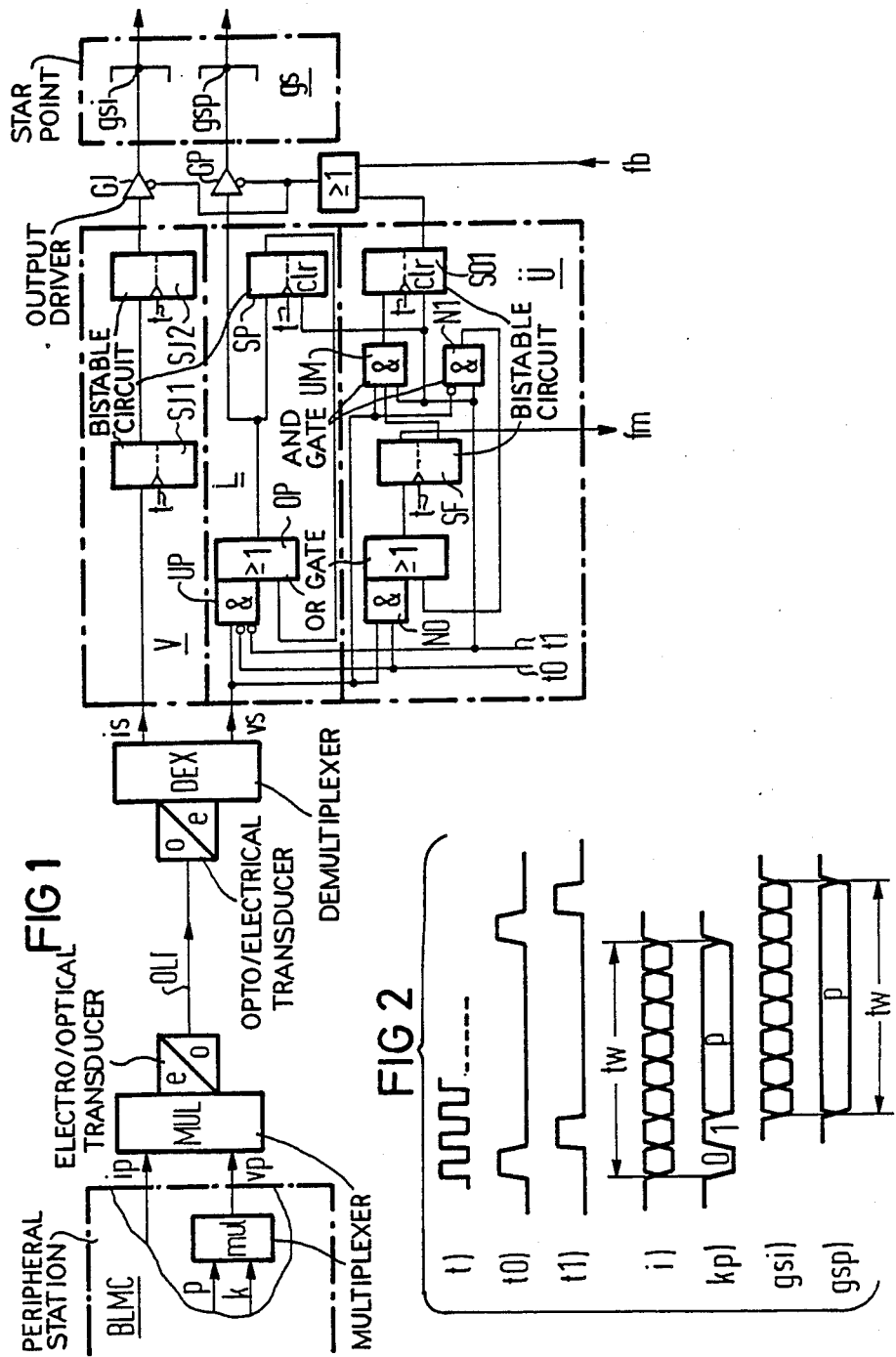

MONITORING SYSTEM FOR A LOCAL BUS NETWORK IN A STAR STRUCTURE

This is a continuation, of application Ser. No. 187,023 filed Apr. 27, 1988, now abandoned.

BACKGROUND OF THE INVENTION

1. Field of the Invention

The present invention relates to what are referred to as local networks (LAN) in which the appertaining stations have access to a common transmission medium by controlling access of each station to the medium. LANs are often used for a rapid transmission of digital signals between changing remote stations in close proximity with one another. Such local networks are usually distinguished from one another based on their topology, type of transmission medium, and on the type of access method. A fundamental distinction in topological terms is thereby made between star networks, (undirected) line or bus networks and (directed) ring networks, whereby the respective star point in star networks can, in turn, be constructed in a bus-like or ring-like manner.

2. Description of the Prior Art

Errors of a peripheral station such as, for example, a short circuit, can lead to the outage of the entire system in multipoint bus systems, i.e. in bus systems having wired OR star points. Such errors are extremely disrupting, particularly in systems which utilize time-division multiplexing. Such a total outage can be countered by doubling the bus system; however, doubling the bus system is quite involved. In a bus network in a star structure in which the individual star lines are brought together at a central star point, it is also possible, after localization of the error, to disconnect the affected star line at the star point; however, this still involves a relatively great fault penetration range given a star line utilizing time-division multiplexing. The present invention discloses a way to limit the fault penetration range of peripheral station faults occurring at the star point.

SUMMARY OF THE INVENTION

The object of the present invention is to provide a monitoring system for diminishing the fault penetration range of peripheral station faults in a local bus network in a star structure having star lines associated with respect to the transmission direction, whereby such star lines can be particularly established by intermediate lines (links) of a telephone exchange system leading to a common switching stage input. The monitoring system is to the present invention, characterized in that the transmission channels leading from the peripheral stations to the central star point are each monitored at the star point for the appearance of a channel state signal associated with the transmission channel. The channel state signal sent from the respective station and identifies the transmission channel as being busy or free. The useful communication data signals transmitted in the transmission channel are forwarded to the central star point only after recognition of a "busy" condition of the channel state signals. If a "busy" condition does not occur, the respective communication data signals are inhibited at the appertaining central star point.

In star lines operated in accordance with time-division multiplex principles, use of the present invention limits the penetration range of station-conditioned faults to those transmission channels that are actually affected by the fault. Consequently, such malfunctioning transmission channels are inhibited without disturbing the remaining bus system.

According to another feature of the invention, the channel state signal can be monitored at the central star point from a channel state/parity signal formed in the peripheral stations by placing the respective channel state signal before the parity bits belonging to the individual useful communication data words. The channel state/parody signal is transmitted via the star line in combination with the appertaining useful communication data word. The communication data word together with the parity bit can be through-connected to the bus line located in the star point only after recognition of the "busy" signal.

According to a further feature of the invention, the communication data word is delayed in a delay circuit for the duration of time it takes to receive and recognize a busy condition on the channels state/parity signal. The respective parity signal is stretched to coincide with the duration of the communication data word and through connected to the central star point concurrently with the communication data word when the "busy" condition is detected.

BRIEF DESCRIPTION OF THE DRAWINGS

Other objects, features and advantages of the invention, its organization, construction and operation will be best understood from the following detailed description, taken in conjunction with the accompanying drawings, of which:

FIG. 1 is a schematic representation of an exemplary embodiment of a monitoring system constructed in accordance with the present invention;

FIG. 2 is a pulse chart showing the signal states in FIG. 1;

DESCRIPTION OF THE PREFERRED EMBODIMENTS

Figure 3:
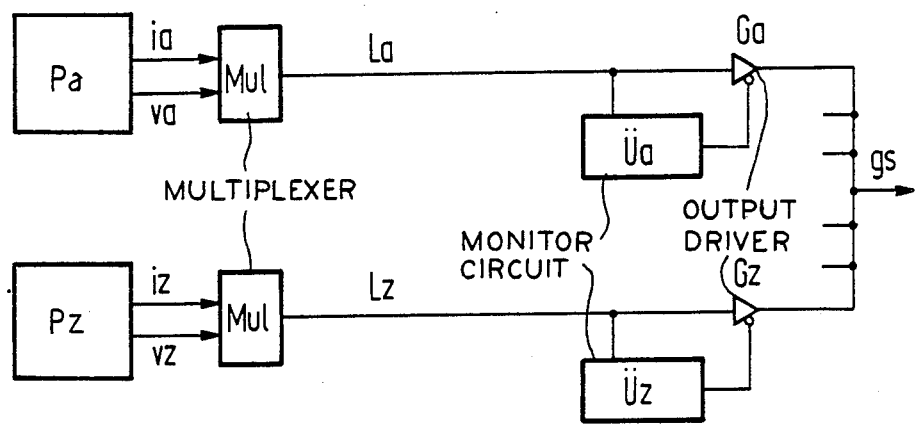
FIG. 3 is a schematic representation of a further exemplary embodiment of a monitoring system constucted in accordance with the present invention.

FIG. 1 schematically shows a local bus network in a star configuration to an extent necessary for an understanding the invention in which star lines OLI, associated with the transmission direction leading therein from peripheral stations BLMC, to a central star point gs are shown. The star lines can include time-division multiplex intermediate lines (links) leading to an input of a switching stage of a telephone switching system, for example in a broadband ISDN digital switching system EWSD as known from telcom report, Vol. 9 1986, pp. 1–14. Specifically FIGS. 3–5, can involve light waveguides leading within a line trunk group encompassing, for example, 384 terminals from a broadband line unit encompassing, for example, 16 terminals to a B-channel group switch. As may likewise be seen from FIG. 1, the light waveguide provided in such a star line leads from an electro/optical transducer e/o following a multiplexer MUL to an opto/electrical transducer o/e preceding a demultiplexer DEX. The (B-channel) useful communication data signal words appearing in signal line ip may be an 8-Mbit/s bit stream which combines 120 B-channels. The signals on line ip are combined in the multiplexer MUL with the accompanying signal words appearing on signal line vp. It is assumed that the accompanying signal words themselves thereby are each composed of a parity bit belonging to the respective useful communication data word and a channel state signal inserted therein at the beginning and identifying the transmission channel as free or busy. As indicated in FIG. 1 the parity bit appearing in the peripheral station BLMC on a parity bit line p and the channel state signal appearing on a status signal line k are combined in a multiplexer mul to form a corresponding channel state/parity word. Such a channel state/parity word formed with a channel state signal 01 and a parity bit Pis indicated in FIG. 2 in the line kp. The length of the channel state/parity word corresponding to the length tw of the appertaining useful communication data word is indicated in FIG. 2 in line i. Here, it is assumed that the channel state signal 01 identifies the appertaining transmission channel as being busy, whereby a channel state signal 11 identifies the appertaining transmission channel as free. The channel state signal 00 or 10 indicates a fault.

The channel state/parity word formed in the peripheral station BLMC by placing the respective channel state signal (01 or, respectively, 11) in front of the parity bit P belonging to the respective useful communication data word is transmitted via the star line OLI in combination (multiplex combination established by the multiplexer MUL) with the appertaining useful communication data word. After demultiplexing in the demultiplexer DEX, the useful communication data word indicated in FIG. 2 in line i appears at the signal output is, whereas the channel state/parity word indicated in FIG. 2 in line kp simultaneously appears at the signal output vs. Before the signal is and the appertaining parity bit proceed to the actual star point gs, the transmission channels leading from the peripheral station BLMC to the central star point gs are respectively monitored at the star point gs for the appearance of the channel state signal which identifies the transmission channel as being busy or free. The communication data signal transmitted in the transmitted channel is only (forwarded) to the central star point gs after recognition of a "busy" signal 01 on the appertaining transmission channel. Otherwise, the communication data signal is effectively disconnected from the central star point gs.

According to FIG. 1, the input of a monitoring circuit U is connected to the accompanying signal line vs for this purpose. The monitoring circuit U controls a gate circuit (output driver) GJ inserted between the useful signal line is and the useful signal bus line gsi located at the star point gs. The monitoring circuit U also controls a gate circuit GP inserted between the accompanying signal line vs and an accompanying signal bus line gsp provided at the star point gs. The circuit U controls the gate circuits GI and GP based on the detection of the respective channel state signal, whereby the useful signal word together with the parity bit is through-connected to the bus line gsi or, respectively, gsp located in the star point gs only after recognition of the "busy" signal 01. Otherwise, the appertaining transmission channel is effectively disconnected from the central star point gs by the gate circuits GJ, GP leading thereto.

When the signal element 0 does not appear in the time slot of the first signal element of the channel state signal and/or when the signal element 1 does not appear in the time slot of the second signal element of the channel state signal, then the coincidence condition is met in the monitoring circuit U in the monitoring system set forth with reference to FIG. 1. An AND gate NO connected to the accompanying signal line vs at its signal input is gated by a clock signal line t0 by means of a clock signal (indicated in FIG. 2, line t0) in the respective time slot of the first channel state signal element. An AND gate N1 that has an input connected to the accompanying signal line vs is gated by a signal line t1 by a clock signal (indicated in FIG. 2, line t1) in the respective time slot of the second channel state signal element. This respectively results in the activation of a fault-indicating memory established by a bistable circuit SF which has a complimentary and non-complimentary output. When the bistable circuit SF is not activated in the time slot of the second channel state signal element, i.e. when a channel state signal element 0 has previously appeared, a logical "0" appears at the output of AND gate UM which is connected at the input thereof to the bistable circuit SF and to the accompanying signal line vs and is gated by the clock signal line t1 in the respective time slot of the second channel state signal element. This causes the following bistable circuit S01 to assume its quiescent condition. As long as this trigger circuit S01 is in its quiescent condition, it emits an inhibit signal to the gate circuits (output drivers) GJ, GP that lead to the star point gs. The gate circuits GJ, GP become transmissive only when the trigger circuit S01 is activated, i.e. when, in this example, the channel state signal 01 identifying the transmission channel under consideration has been recognized, so that the useful communication data word transmitted in the transmission channel is through-connected to gsi after it is delayed during the check of the channel state signal. The delay is facilitated by a delay circuit V formed with two bistable circuits SJ1, SJ2. Thus, the communication data word is through-connected (simultaneously with the appertaining parity word) to the bus lines gsi or, respectively, gsp located in the star point, in the time slot to be seen from the lines gsi and gsp of FIG. 2. As may also be seen from FIG. 2 line gsp, the parity bit P can be lengthened to the full length of the useful communication data word. In the circuit arrangement illustrated in FIG. 1, this is achieved with the assistance of a lengthening circuit L in which the parity bit appearing on the accompanying signal line vs is fed by way of an gated element UP, inhibited by the clock signal lines t0 and t1 in the time slot of the channel state signal. By way of a following OR gate OP, the parity bit is sent not only to the input of the gate circuit GP leading to the star point gs, but also to a bistable circuit SP respectively placed in its quiescent condition by the clock t1 of the second channel state signal element, the output of the bistable circuit SP being returned to the second input of the OR gate OP.

In the exemplary embodiment of a monitoring system in accordance with the present invention set forth with reference to FIG. 1 wherein, moreover, the edge-controlled bistable circuits SF, S01, SJ1, SJ2, SP may each be assumed to be charged with a clock signal at their respective clock inputs t, as indicated in FIG. 2, line t, the respective channel state signal 01 or, respectively, 11 is located in front of a parity bit P of corresponding length assigned to the individual useful signal word, being placed in front thereof in the peripheral stations BLMC, and is transmitted by way of the star line OLI in a channel state/parity word formed in this manner and in combination with the appertaining useful signal word, and the correspondingly delayed useful signal word and, simultaneously therewith, the correspondingly-lengthened parity bit, are respectively through-connected to their own bus lines gsi or gsp located in the star point only after the recognition of the "busy" signal 01.

The present invention, however, is not limited to the foregoing in that, given recognition of the "busy" signal (in a channel state/parity signal formed in the peripheral stations and transmitted by way of the star line in (multiplex) combination with the appertaining useful signal word), [together with the useful signal word] a parity bit that is separate from the useful signal word and that has either the length of a signal element or, as set forth above, has the length of the entire useful signal word, is through-connected to the star point gs of the local bus network comprising two separate star point bus lines at its receiving side.

In the course of monitoring the transmission channels leading from the peripheral stations to the central star point for the appearance of channel state signals carried along as transmission channel-associated information proceeding from the respective station and identifying the transmission channel as busy or free, it is also possible, given recognition of a "busy" signal, to respectively through-connect only the useful communication data word transmitted in the transmission channel that may also co-encompass an appertaining parity bit, through-connecting the same to a star point that comprises only one star point bus line at the receiving side and to otherwise inhibit the appertaining transmission channel at the central star point at the receiving side, as shown in FIG. 3.

FIG. 3 schematically illustrates a local bus network in a star configuration in which transmission-direction associated star lines La . . . Lz extend from peripheral stations Pa . . . Pz to a central star point bus line gs. In the peripheral stations, it is assumed that channel state signals appearing on state signal lines va . . . vz are applied in front of the useful communication data words appearing on the useful signal lines ia . . . iz, this being indicated in FIG. 3 by the multiplexer Mul shown therein. The channel state signals therefore carried along in a transmission channel-associated manner by way of the respective star line La . . . Lz proceeding from the respective, peripheral station and identifying the respective transmission channel as busy or free, are then monitored at the star point gs with the assistance of a respective monitoring circuit Ua . . . Uz that can be basically constructed in the manner to be seen from FIG. 1. Each monitoring circuit Ua . . . Uz controls a gate circuit (output driver) Ga . . . Gz connecting the respective star line La . . . Lz to the star line bus line gs. The useful communication data signal transmitted in the transmission channel is respectively transmitted (forwarded) after the recognition of a "busy" signal, whereas the appertaining transmission channel is otherwise inhibited at the central star point at the receiving side.

Figure 4:
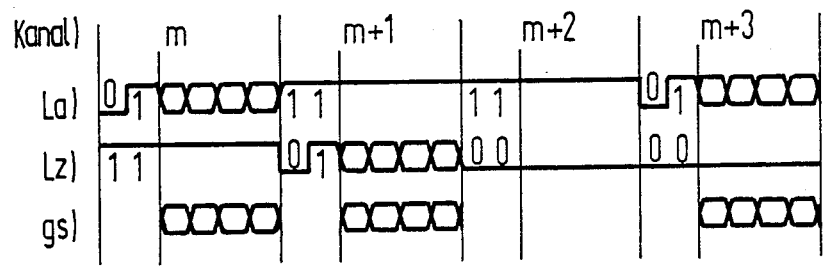
FIG. 4 is a pulse chart illustrating the signal states of the apparatus of FIG. 3.

It is assumed that FIG. 4 of the drawing is considered for this purpose. FIG. 4 shows a transmission sequence of digital signals from the peripheral stations to the central star point gs (in FIG. 3) via the star lines La . . . Lz of FIG. 3 for four successive time slots m, m+1, m+2, m+3. The line La indicates the signal state on the star line La of FIG. 3 and the line Lz indicates the signal state on the star line Lz of FIG. 3 and the line gs shows the signal state on the star point bus line gs of FIG. 3 that results therefrom.

The star line La is occupied or busy in the time slot m, this being indicated by the channel state signal 01 preceding the useful signal word (indicated here with four bits); at the same time, the star line Lz is free, this being indicated by the channel state signal 11.

After the monitoring circuit Ua recognizes the channel state signal 01, the gate circuit Ga is unlocked for the following useful signal word, so that the latter, as also indicated in the line gs of FIG. 4, proceeds onto the star point bus line gs of FIG. 3.

Conversely, the star line La is free in the time slot m+1 and the star line Lz is occupied or busy, wherewith the gate circuit Gz for the following useful signal word is now unlocked in a corresponding manner after the monitoring circuit Uz recognizes the channel state signal 01 so that the useful signal word, as also indicated in the line gs of FIG. 4, proceeds onto the star point but lines gs.

The star line La is free again in the time slot m+2, whereas the star line Lz, due to a fault cause, for example, by a short circuit, now carries the signal element 00 in the time slot of the channel state signal; none of the monitoring circuits Ua, Uz therefore responds, so that none of the gate circuits Ga, Gz are unlocked in the time slot m+2.

In the time slot m+3, the transmission channel of the star line Lz in FIG. 3 is likewise affected by a fault as indicated in line Lz of FIG. 4, whereas the channel state signal 01 signals the "busy" state for the star line La of FIG. 3 according to line La of FIG. 4, so that the gate circuit Ga is unlocked proceeding from the monitoring circuit Ua and the useful signal word transmitted by way of the star line La in this time slot proceeds onto the star point bus line Gs, as may also be seen from the line gs of FIG. 4.

In conclusion, and with reference to FIG. 1, it should be noted, as likewise indicated on the drawing, a channel state error, when identified, can also be reported to a higher-ranking device via an error message line fm from the monitoring circuit U, whereby an inhibit signal can also be correspondingly connected to the gate circuits Gj, Gp leading to the star point gs, being connected thereto by such a higher-ranking device via a control line fb.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a star network having a plurality of non-distinct peripheral stations, each connectable to a star point through which all communication between said peripheral stations must pass, the improvement of a system for limiting the penetration of peripheral station transmission faults throughout said star network, said system comprising:

means at each peripheral station for generating channel state signals and communication data signals at an output thereof, said channel state signals identifying whether a transmission channel of said peripheral station is in a busy condition;

transmission line means associated with each peripheral station, accepting said channel state signals and said communication data signals from the associated peripheral station, for serially transmitting therethrough said channel state and said communication data signals; and isolation means at said star point, accepting the signals transmitted through said transmission line means, for connecting said transmission line means to said star point in response to said channel state signals whenever said channel state signals indicate a busy condition and for disconnecting said transmission line means from said star point whenever said channel state signals do not indicate a busy condition.

2. A system for limiting the penetration of peripheral station transmission faults in a star configuration local bus network as recited in claim 1, wherein said transmission line means comprises:

multiplexing means accepting said channel state signals and said communication data signals from said means at each peripheral station, for selectively through-connecting either said communication data signals or said channel state signals to an output of said multiplexing means; and cable means accepting the output of said multiplexing means for serially transmitting the output of said multiplexing means therethrough to said isolation means.

3. A system for limiting the penetration of peripheral station transmission faults in a star configuration local bus network comprising:

peripheral station means for generating channel state signals, communication data signals, and parity information signals at the output thereof, said channel state signals indicative of whether a transmission channel of said peripheral station is in a busy condition;

transmission line means accepting said channel state signals, said communication data signals, and said parity information signals from said peripheral station means for serially transmitting therethrough said channel state, said communication data signals, and said parity information signals; and isolation means accepting the signals transmitted through said transmission line means for through-connecting said communication data signals and said parity information signals to a central star point in response to said channel state signals whenever said channel state signals indicate a busy condition and for disconnecting said communication data signals from the central star point whenever said channel state signals do not indicate a busy condition.

4. A system for limiting the penetration of peripheral station transmission faults in a star configuration local bus network as recited in claim 3, wherein said transmission line means comprises:

a first multiplexing means accepting said channel state signals and said parity information signals from said peripheral station means for selectively through-connecting either said channel state signals or said parity information signals to an output of said first multiplexing means;

a second multiplexing means accepting said communication data signals and the output of said first multiplexing means for selectively through-connecting either the output of said first multiplexing means or said communication data signals to the output of said second multiplexing means;

cable means accepting the output of said second multiplexing means for serially transmitting therethrough the output of said second multiplexing means; and demultiplexing means accepting signals transmitted through said cable means for separating signals received through said cable means into a first output signal consisting of said communication data signals and a second output consisting of said channel state signals and said parity information signals.

5. A system for limiting the penetration of peripheral station transmission faults in a star configuration local bus network as recited in claim 4, wherein said isolation means comprises:

channel state identification means accepting said second output signal of said demultiplexing means for detecting a busy condition of said channel state signals and generating a control signal output indicative of a busy condition of said channel state signals;

delay means accepting said first output of said demultiplexing means for delaying the through-connection of said communication data signals to an output of said delay means for a duration of time sufficient to allow said channel state identification means to generate said control signal output in response to a busy condition of said channel state signals; and buffer means accepting said control signal from said channel state identification means and accepting the output of said delay means for through-connecting the output of said delay means to said central star point whenever said control signal indicates a busy condition of said channel state signals, said buffer means providing means for disconnecting the output of said delay means from said central star point whenever said control signal does not indicate a busy condition of said channel state signals.

6. A system for limiting the penetration of peripheral station transmission faults in a star configuration local bus network as recited in claim 5, further comprising:

parity stretching means accepting said second output of said demultiplexing means for stretching each of said parity information signals to a duration equivalent to a message packet of said communication data signals thereby to generate a stretched parity signal at the output of said parity stretching means; and further buffer means accepting said control signal from said channel state identification means and accepting said stretched parity signal for through-connecting said stretched parity signal to said central star point whenever said control signal indicates a busy condition of said channel state signals and for disconnecting said stretched parity signal from said central star point whenever said control signal does not indicate a busy condition of said channel state signals.

7. A system for limiting the penetration of peripheral station transmission faults in a star configuration local bus network as recited in claim 4, wherein said cable means comprises:

an electro/optical transducer means accepting the output of said second multiplexing means for converting the output of said second multiplexing means into an optical signal;

optical transmission means accepting said optical signal from said electro/optical transducer means for transmitting therethrough said optical signal; and opto/electrical transducer means accepting said optical signal from said optical transmission means for converting said optical signal into an electrical signal and for supplying said electrical signal to said demultiplexing means.

* * * * *